April 19, 1966     J. N. CAROTHERS ETAL     3,246,948
PROCESS FOR PRODUCING CITRATE SOLUBLE CALCIUM PHOSPHATE
Filed Oct. 3, 1962
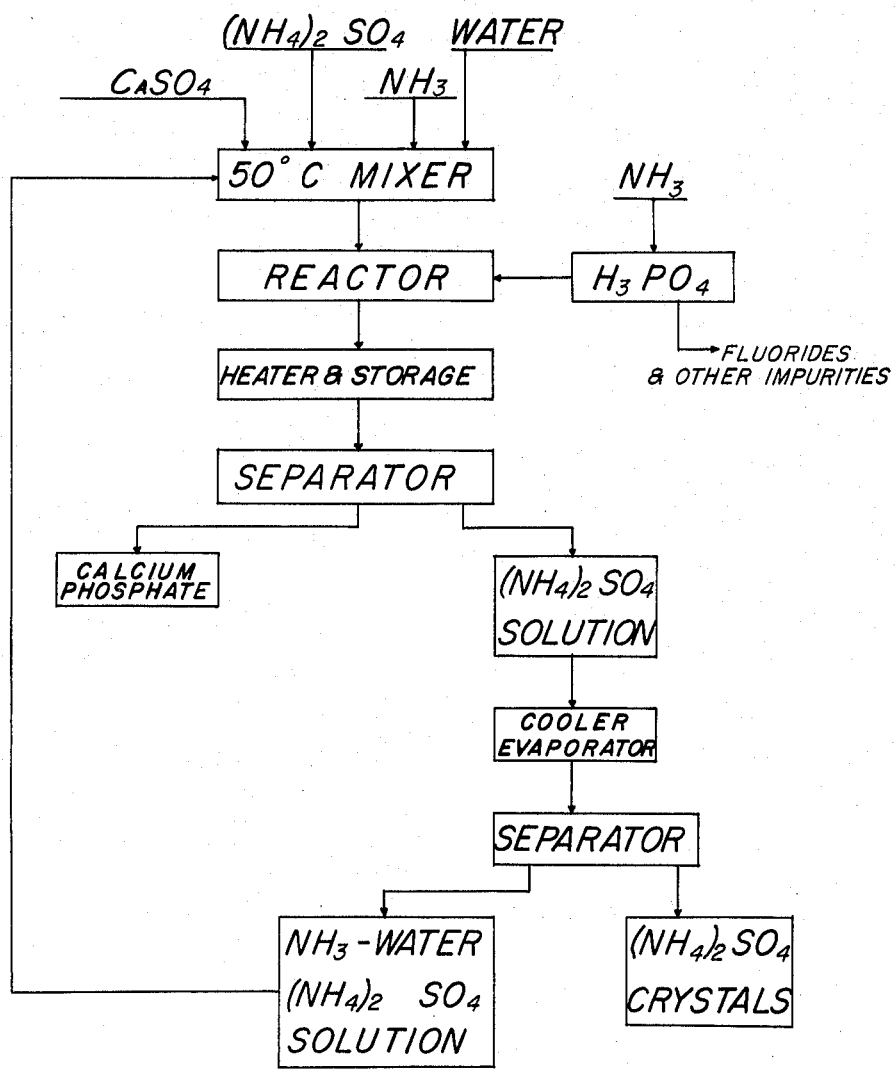
INVENTORS
J. N. CAROTHERS
R. J. HURKA, JR.
BY
ATTORNEYS United States Patent Office 3,246,948
Patented Apr. 19, 1966

1

3,246,948
PROCESS FOR PRODUCING CITRATE SOLUBLE
CALCIUM PHOSPHATE
John N. Carothers and Rudolph J. Hurka, Jr., both of
1629 Lady Marion Lane NE., Atlanta, Ga.
Filed Oct. 3, 1962, Ser. No. 229,268
5 Claims. (Cl. 23—109)

This application is a continuation in part of our previously filed application Serial No. 141,499, filed Sept. 28, 1961, now abandoned, and relates to a process for treating gypsum, or calcium sulfate, to obtain citrate soluble calcium phosphate which is more basic than dicalcium phosphate, and ammonium sulfate.

More specifically our invention relates to a process of utilizing gypsum which is obtained when phosphate rock is acidulated with sulfuric acid, to produce ammonium sulfate, and recover a calcium phosphate which is more basic than dicalcium phosphate, and which is useful as an animal feed supplement or as a fertilizer and which is soluble in a neutral ammonium citrate solution. Calcium sulfate from other sources may also be used as a source of sulfate in ammonium sulfate, and of calcium in calcium phosphate.

The objects of this invention are:

(1) The utilization of gypsum which is a waste product when phosphate rock is acidulated with sulfuric acid to make phosphoric acid, to react with ammonia and produce ammonium sulfate, which is useful as a fertilizer, and also in chemical operations.

(2) In utilizing the sulfate in gypsum to make ammonium sulfate, simultaneously to use the calcium and to react with water soluble phosphate to make a useful calcium phosphate, whereby it shall be unnecessary to provide lime or limestone as a source of calcium.

Briefly stated, our invention is carried out by reacting calcium sulfate and a water soluble phosphate in an aqueous ammoniacal system in which the ammonia present is in excess of that required to react the phosphate to the tribasic stage, and in which the temperature in the system is maintained below 60° C., preferably around 50° C., during the reaction. The phosphate in the system is in amount sufficient to combine with the calcium present in the calcium sulfate and form tribasic phosphate. Ammonium sulfate is produced in solution and separated from the solid calcium phosphate, cooled to form solid ammonium sulfate, and thus yield a valuable by-product. The ammonium sulfate solution containing ammonia, after separation of the solid ammonium sulfate, is then returned to the process to be mixed with additional gypsum for subsequent reaction, and recycling.

The presence of ammonia in excess of that required to convert the added phosphate to the tri-basic stage is essential to the formation of unreverted calcium phosphate. It will be understood that if an initial slurry of calcium sulfate and ammonia is formed, and ammonium phosphate added a reaction begins in which ammonium sulfate is formed as one of the products. As the reaction proceeds, there will be an increasing quantity of ammonium sulfate present. As will be seen hereafter we preferably start with a slurry of gypsum, ammonium sulfate, ammonia, and water.

It is also essential to maintain the temperature of the mixture below 60° C., preferably around 50° C. during the addition of the phosphate and subsequently while the calcium phosphate is being formed. After the phosphate is added, the temperature of the mixture is increased from about 50° C. to about 65° C. for the purpose of increasing the size of the calcium phosphate crystals whereby the separation of the solid and solution is made an easier operation.

In this application wherever we use the term "reverted"

2 phosphate, we mean that it is insoluble in neutral ammonium citrate solution when determined according to the proceedure described by the Association of Official Agricultural Chemists; and by "unreverted" phosphate that it is soluble in neutral ammonium citrate solution when determined by the same procedure. "Available" is a term used in the fertilizer industry, and is understood to be synonomous to unreverted phosphate. The expression "parts" means parts by weight.

Insofar as we are aware no one has described a process for reacting gypsum, ammonium sulfate, ammonia and water, with a water soluble phosphate to produce a citrate soluble tricalcium phosphate, or a phosphate more basic than dicalcium phosphate available as plant food. There are numerous references in reports of investigations in which it is stated that tricalcium phosphate is undesirable for use as a fertilizer because of its content of reverted phosphate, i.e. it has a low availability. Such a reference is found in U.S. Patent No. 1,699,393 describing a process for making dicalcium phosphate, and in U.S. Patent No. 2,057,025 describing a process for making a fertilizer. Keenen, in Industrial and Engineering Chemistry, vol. 22, No. 12, page 1378, sets forth in particularity the results of ammoniating superphosphate. These patents and publication state that when an excess of ammonia is added over that required to produce dicalcium phosphate, i.e. to make tricalcium phosphate, the phosphate content of the tricalcium phosphate so produced is generally considered partially unavailable and undesirable for fertilizer purposes.

Our invention may be understood by reference to the accompanying flow sheet. In accordance with the preferred way of carrying out our invention we form a slurry of gypsum, ammonium sulfate, ammonia and water in proportions hereafter described in the example of our process. Then we add a water soluble phosphate, preferably as diammonium phosphate in solution, in such quantities as to form, upon completion of the reaction with the calcium sulfate, a citrate soluble calcium phosphate more basic than dicalcium phosphate which we designate as tricalcium phosphate.

In order to prevent the formation of reverted tricalcium phosphate, it is essential that the phosphate be added to the ammoniacal calcium sulfate slurry, and not the other way around, if the phosphate added is more acidic than the tri basic stage. However calcium sulfate, or an ammoniacal calcium sulfate slurry may be added to an ammoniacal phosphate solution, provided ammonia is present in excess of that required to react with any acidity in the solution and form tri ammonium phosphate.

As the reaction proceeds, ammonium sulfate and calcium phosphate are formed, the reaction going to completion with the formation of citrate soluble tricalcium phopsphate and ammonium sulfate. When the process is operated cyclically, after the tricalcium phosphate is separated from the solution, the solution is cooled, the crystallized portion of the ammonium sulfate separated from the solution, and the solution, containing ammonium sulfate and ammonia, is returned to the next cycle. Thereafter there will always be ammonium sulfate present when the reaction begins.

The diammonium phosphate solution may be formed by introducing ammonia into phosphoric acid. Upon neutralization of the acid, fluorides and other impurities are precipitated and may be separated from the solution.

Following is a typical example:
Form a slurry containing:

72.4 parts $(NH_4)_2SO_4$ or 0.548 part mole
28.3 parts $CaSo_4 \cdot 2H_2O$ or 0.164 part mole
7.5 parts $NH_3$ or 0.44 part mole
86 parts $H_2O$ or 4.77 parts mole Heat slurry to 50° C. and gradually add the solution formed by dissolving 14.5 parts diammonium phosphate or 0.11 part mole containing 0.055 part mole $P_2O_5$ in 20 parts $H_2O$ or 1.11 part mole. Maintain vigorous stirring and maintain temperature of the slurry at about 50° C. After the phosphate solution has been added continue stirring for several hours, gradually heating the slurry to 65° C. Separate the precipitated calcium phosphate from the slurry, and wash with water to recover adhering solution. Cool the separated solution to 30° C. Separate crystallized ammonium sulfate. Return the mother liquor to cycle, replacing $NH_3$ reacted during the previous cycle, and adding calcium sulfate to form a fresh batch of starting slurry. The precipitated calcium phosphate recovered is substantially completely soluble in neutral ammonium citrate solution. About 18 parts precipitated phosphate, containing less than 1 part calcium sulfate, are recovered along with about 20 parts ammonium sulfate. On succeeding batches the water introduced as water of crystallization, if any, of calcium sulfate, and the water added as a component of the phosphate solution, is evaporated prior to recovery of the ammonium sulfate. It will be observed that whereas the calcium sulfate and ammonium phosphate are in proportions to form tricalcium phosphate, the ammonia present is in substantial excess of the amount required to neutralize diammonium phosphate to the tribasic stage.

When the calcium sulfate contains impurities which are objectionable, they may be removed by well known means. Likewise, when the phosphoric acid used to prepare the ammonium phosphate contains objectionable impurities, they may be removed by well known means.

Although it is feasible to use phosphoric acid as the phosphate to be added to the slurry of calcium sulfate, ammonium sulfate, ammonia and water, it is preferable, as set forth above, to neutralize the acid with ammonia, prior to the addition, at least to the diammonium stage. The ammonium sulfate and the excess of ammonia act to dissolve the calcium sulfate.

During the interval in which the phosphate is being added to the calcium sulfate slurry, the temperature of th mix is kept in the range 50–60° C. After all of the phosphate has been added, the temperature of the slurry is increased to about 65° C., and the slurry is maintained at this temperature for a few hours. We have found that 2 hours is sufficient. During this interval, at the increased temperature, the crystals of the precipitate initially formed grow to larger size, and this makes subsequent separation of solid and liquid more easily carried out. A small quantity of water is needed to wash adhering mother liquor from the solid. This wash water is subsequently removed from the system by evaporation.

When the calcium sulfate, ammonium sulfate, ammonia and water are mixed in the concentrations described, and heated, crystallization of double salts of calcium sulfate and ammonium sulfate may occur, and the slurry may thicken.

If the temperature of the calcium sulfate, ammonium sulfate, ammonia and water slurry is substantially above 60° C. during the phosphate addition, there is an increase in the quantity of reverted phosphate. However, when the phosphate is added to the calcium sulfate slurry at a temperature in the range of 50–60° C., there is no substantial quantity of reverted phosphate formed.

As many apparently widely different embodiments of this invention may be made without departing from the spirit and scope thereof, it is to be understood that the invention is not limited to the specific embodiments thereof, except as defined in the appended claims.

What we claim is:

1. The process of producing a citrate soluble calcium phosphate more basic than dicalcium phosphate which comprises forming a slurry containing calcium sulfate, ammonium sulfate, ammonia and water, adding to said slurry ammonium phosphate to react therewith and from calcium phosphate and additional ammonium sulfate, while maintaining the temperature below 60° C., separating the resulting calcium phosphate and ammonium sulfate therefrom, and recycling the remaining ammonia, water and ammonium sulfate solution to mix with a fresh batch of calcium sulfate and ammonia, the ammonia present in said slurry being substantially in excess of that required to react any phosphate in the slurry to the tribasic stage and the moles of calcium in said slurry being approximately 3 times the moles of $P_2O_5$ therein.

2. A process as defined in claim 1 in which the phosphate and solid ammonium sulfate formed by the reaction is separated from the mixture and the remaining water, ammonia and ammonium sulfate solution is recycled to react with a fresh batch of calcium sulfate.

3. The process of treating calcium sulfate to produce citrate soluble calcium phosphate more basic than dicalcium phosphate which comprises forming a slurry of calcium sulfate, ammonium sulfate, ammonia and water at a temperature of approximately 50° C., introducing a diammonium phosphate solution into said slurry, after adding said ammonium phosphate solution heating the mixture to a temperature of approximately 65° C., and separating precipitated calcium phosphate therefrom. the ammonia present in said slurry being substantially in excess of that required to react any phosphate in the slurry to the tribasic stage and the calcium therein being approximately 3 moles for each mole of $P_2O_5$ therein.

4. The process defined in claim 3 in which the diammonium phosphate solution is formed by neutralizing phosphoric acid with ammonia, precipitating fluorides and other impurities, and separating said fluorides and other impurities from the solution.

5. The process defined in claim 3 in which, after separating the tricalcium phosphate, the solution is cooled, crystallized ammonium sulfate is removed therefrom, and the remaining solution containing ammonium sulfate and ammonia is employed to react with additional calcium sulfate ammonia, and ammonium phosphate.

References Cited by the Examiner

UNITED STATES PATENTS

| | | | |
|---|---|---|---|
| 1,699,393 | 1/1929 | Hagens et al. | 71—41 |
| 2,942,967 | 1/1960 | Caldwell | 71—64 |

MAURICE A. BRINDISI, *Primary Examiner.*